sing the second reference weight with the sum of the first
United States Patent
Armangau et al.

(12)

(10) Patent No.: US 10,140,307 B1
(45) Date of Patent: Nov. 27, 2018

(54) EFFICIENTLY MANAGING REFERENCE WEIGHTS FOR WRITE SPLITS

(71) Applicant: EMC IP Holding Company LLC, Hopkinton, MA (US)

(72) Inventors: Philippe Armangau, Acton, MA (US); Jean-Pierre Bono, Westborough, MA (US); Yubing Wang, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 489 days.

(21) Appl. No.: 15/086,629

(22) Filed: Mar. 31, 2016

(51) Int. Cl.
*G06F 17/30* (2006.01)

(52) U.S. Cl.
CPC ...... *G06F 17/30138* (2013.01); *G06F 17/301* (2013.01); *G06F 17/30088* (2013.01); *G06F 17/30165* (2013.01)

(58) Field of Classification Search
CPC ......... G06F 17/30138; G06F 17/30165; G06F 17/301; G06F 17/30088
See application file for complete search history.

(56) References Cited

U.S. PATENT DOCUMENTS

| 8,412,688 | B1 | 4/2013 | Armangau et al. |
| 8,615,500 | B1 | 12/2013 | Armangau et al. |
| 8,943,282 | B1 | 1/2015 | Armangau et al. |
| 9,311,333 | B1 | 4/2016 | Pawar et al. |
| 9,442,955 | B1 | 9/2016 | Pawar et al. |
| 9,696,919 | B1 | 7/2017 | Vankamamidi et al. |
| 9,880,743 | B1 * | 1/2018 | Armangau ............ G06F 3/0608 |
| 9,922,039 | B1 * | 3/2018 | Armangau ............ G06F 3/0611 |
| 2013/0054927 | A1 * | 2/2013 | Raj ........................ G06F 3/0608 711/170 |
| 2013/0262758 | A1 * | 10/2013 | Smith ................... G06F 3/0605 711/112 |
| 2018/0267985 | A1 * | 9/2018 | Badey ............... G06F 17/30088 |

* cited by examiner

*Primary Examiner* — Alicia M Willoughby
(74) *Attorney, Agent, or Firm* — BainwoodHuang

(57) ABSTRACT

A technique for performing overwrites on shared data blocks in a file system transfers reference weights of block pointers to other block pointers that share those data blocks. To overwrite a portion of a file stored in a shared data block pointed to by a first block pointer, a file system manager locates a second block pointer in the file system that points to the same data block. The first block pointer has a first reference weight, and the second block pointer has a second reference weight. The file system manager transfers the first reference weight to the second block pointer, e.g., by replacing the second reference weight with the sum of the first reference weight and the second reference weight.

20 Claims, 6 Drawing Sheets

US 10,140,307 B1

EFFICIENTLY MANAGING REFERENCE WEIGHTS FOR WRITE SPLITS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly arrange data in file systems. File systems include both data and metadata. The metadata organizes file data on disk, such that each file's data can be located, placed in proper sequence, and kept separate from other files' data. File systems often store both their data and metadata in blocks, where a "block" is typically the smallest unit of storage that the file system can allocate and manage. A file system may support blocks of a particular size, such as 4 KB, 8 KB, etc., and some file systems may support multiple block sizes.

Examples of file system metadata include inodes (index nodes), indirect blocks (IBs), and block metadata (BMD). Inodes are provided one per file and store per-file metadata, such as a file's ownership and size, as well as pointers to data blocks that store the file's data. Each inode has a unique inode number in the file system. Typically, an inode stores one or more pointers to IBs, where each IB stores an array of block pointers, such as 1024 block pointers, for example. The block pointers in an IB may point directly to data blocks storing file data, or they may point to other IBs, effectively forming an IB tree. BMD is provided one per data block and may be used for certain metadata blocks, as well. Typically, BMD for multiple data blocks are stored in a single block. The BMD for each data block stores, for example, the inode number of the file that first allocated the data block, a logical address into that file where the data block was allocated, a checksum of the data block's contents, and a reference weight.

In an example, the reference weight in a BMD is a total distributed weight, meaning that its value equals the sum of one or more delegated weights. The delegated weights are stored in block pointers that point to the data block associated with the BMD. For example, if only a single block pointer points to a data block and has a delegated weight of 1000, then the BMD for that data block will typically have a total distributed weight of 1000, as well. In this manner, it can readily be determined that the data block is owned by the block pointer by confirming that the two weights are equal. However, if two block pointers, each having a weight of 500, each point to a data block whose BMD has a total distributed weight of 1000, then it can be determined that the data block is shared by inspecting either of the two block pointers and the BMD, and confirming that the weight in the BMD exceeds the weight in the block pointer.

SUMMARY

A common file system operation is to overwrite data in a shared data block, i.e., a data block that is pointed to by at least two block pointers. Overwriting shared data may result in a "write split," i.e., an operation that effectively breaks the block-sharing relationship between the block pointer at the written-to location and any other block pointers that point to the same data block. If three or more block pointers share the same data block, then only the written-to block pointer is split off, with the other block pointers continuing to share the data block amongst themselves. The split-off block pointer may then be pointed to a newly-allocated data block to which new data are written.

Part of the write split operation involves managing reference weights. For example, in one arrangement, when performing a write split, the file system returns the reference weight of the block pointer being split off to the BMD of the shared data block. In this manner, the file system reduces the total distributed weight of the BMD by an amount equal to the returned weight, such that the sum of the weights delegated to the block pointer or pointers that still share the data block equals the updated total distributed weight.

Unfortunately, this process of returning reference weights from block pointers to BMD of data blocks can be burdensome to data storage systems. For example, to update the total distributed weight in a BMD, it may be necessary to read the BMD from disk, modify the BMD in memory, and write the BMD back to disk. Although performing these acts for BMD of a single data block is generally not of concern, write splits can often extend over many block pointers, e.g., hundreds or even thousands, such that BMD for hundreds or thousands of blocks must be updated to properly manage reference weights. If the file data being overwritten is not sequential, such BMD may be dispersed randomly across diverse storage locations, such that updating BMD for large numbers of blocks in response to large overwrites may require many disk accesses to diverse locations. The burden of performing so many reads and writes to update BMD may be so great as to substantially reduce the throughput of a data storage system in responding to read and write requests from hosts.

In contrast with the above-described prior approach, which returns block pointer reference weights to BMD when performing write splits, an improved technique for performing overwrites on shared data blocks in a file system transfers reference weights of block pointers to other block pointers that share those data blocks. To overwrite a portion of a file stored in a shared data block pointed to by a first block pointer, the improved technique locates a second block pointer in the file system that points to the same data block. The first block pointer has a first reference weight, and the second block pointer has a second reference weight. The technique transfers the first reference weight to the second block pointer, e.g., by replacing the second reference weight with the sum of the first reference weight and the second reference weight.

Advantageously, the file system can continue to compare reference weights in block pointers with those in BMD to distinguish owned data blocks from shared data blocks. However, unlike in the prior scheme, it is no longer necessary to access BMD when performing write splits. Although the new technique does require accessing a second block pointer that points to the shared data block, block pointers for adjacent file locations tend to be grouped together in IBs, even if the data blocks and associated BMD are randomly distributed, such that many block pointers mapping a range of a file can be found in a single IB. Not only that, but also, many file system support snapshots of files, which may share large ranges of blocks and have identical, or nearly identical IBs. In such an arrangement, if an overwrite extends over many megabytes of a file, reference weights may be updated by accessing as few as two blocks—the IB that stores the block pointers being split, from which first reference weights are read, and the IB that stores the block pointers that share the subject data blocks, to which the first reference weights are transferred (e.g., to a snapshot). Thus, instead of having to access BMD from many diverse locations in storage, the improved technique may be performed by accessing as few as 2 locations. The burden of managing reference counts when performing write splits thus drops considerably, with commensurate improvements in data storage system throughput. Host applications undergo fewer delays in receiving responses to read and write requests, and users of host applications enjoy a faster and improved experience overall.

Certain embodiments are directed to a method of overwriting shared data blocks in a file system. The method includes receiving, by a file system manager, a request to overwrite a set of data stored in a range of a file of the file system with new data, the file system including a first block pointer, the first block pointer having (i) a pointer value that maps some or all of the range of the file to a first data block in the file system, and (ii) a first reference weight that tracks an ownership share of the first block pointer in the first data block, the first data block storing at least a portion of the set of data to be overwritten. The method further includes locating a second block pointer in the file system that also maps to the first data block, such that the first block pointer and the second block pointer have a block sharing relationship with respect to the first data block, the second block pointer having a second reference weight that tracks an ownership share of the second block pointer in the first data block. The method still further includes performing a write split operation on the first data block to break the block sharing relationship, by (i) allocating a new data block arranged to store at least a portion of the new data, (ii) writing a new pointer value to the first block pointer, the new pointer value mapping said some or all of the range of the file to the new data block, and (iii) transferring the first reference weight from the first block pointer to the second block pointer such that the second reference weight is made to store a combined weight that tracks the ownership shares previously distributed between the first block pointer and the second block pointer.

Other embodiments are directed to a data storage system constructed and arranged to perform a method of overwriting shared data blocks in a file system, such as the method described above. Still other embodiments are directed to a computer program product. The computer program product stores instructions which, when executed on control circuitry of a data storage system, cause the data storage system to perform a method of overwriting shared data blocks in a file system, such as the method described above. Some embodiments involve activity that is performed at a single location, while other embodiments involve activity that is distributed over a computerized environment (e.g., over a network).

It should be understood that this summary is provided to familiarize the reader with features of disclosed embodiments and is not intended to define the invention hereof or to be limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for performing overwrites on shared data blocks in a file system transfers reference weights of block pointers to other block pointers that share those data blocks. Advantageously, the improved technique leverages the locality of related block pointers in indirect blocks to coalesce transactions and reduce the number of disk accesses required when updating reference weights in response to write splits.

Figure 1:
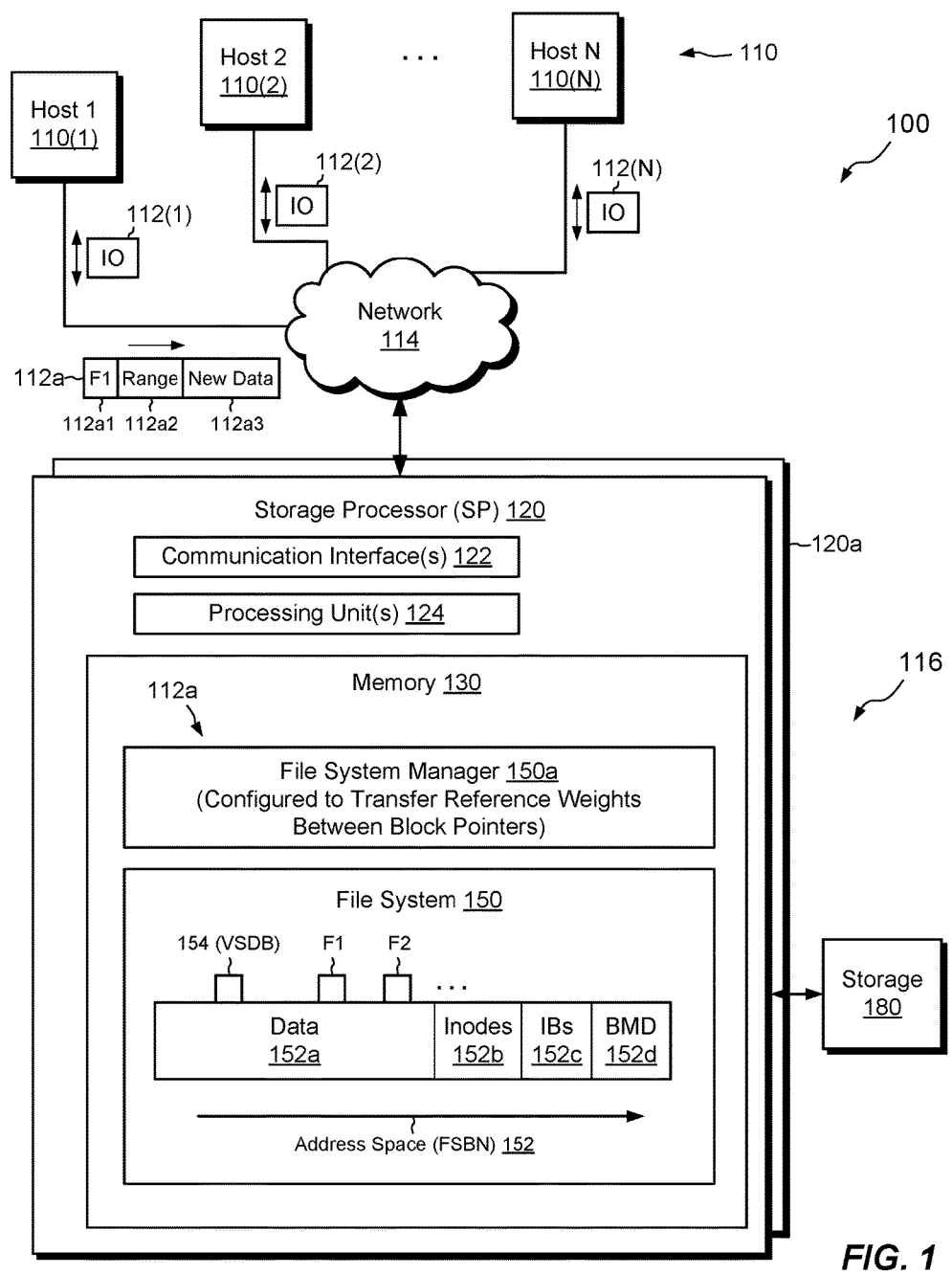
FIG. 1 is a block diagram of an example environment in which improved techniques hereof for overwriting data can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120*a*). In an example, multiple SPs are provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes a file system 150 and a file system manager 150a. The file system manager 150a manages data and metadata of the file system 150 and is configured to transfer reference weights between block pointers, in the manner described herein. In an example, the file system 150 is implemented as an arrangement of blocks, which are organized in an address space 152. Each of the blocks has a location in the address space 152, which may be identified by FSBN (File System Block Number). For example, FSBN may range from zero to some large number, with each value of FSBN uniquely identifying a respective block. In an example, the file system 150 stores both data and metadata in blocks. It should be appreciated that the file system 150 is a logical structure, instantiated in memory 130, and that the data and metadata described herein may reside in non-transitory form in physical storage media, such as in disk drives in the storage 180.

As further shown in FIG. 1, the address space 152 of the file system 150 may be provided in multiple sub-spaces for organizing data and different types of metadata. For example, sub-space 152a may store data (i.e., file data), sub-space 152b may store inodes, sub-space 152c may store indirect blocks (IBs), and sub-space 152d may store BMD (per-block metadata). The use of sub-spaces and the particular sub-spaces shown are merely examples and should not be regarded as limiting. As is known, inodes are metadata structures that store information about files and may include pointers to IBs. IBs include block pointers that point either to other IBs or to data blocks. IBs may be arranged in multiple layers, forming an IB tree, with the leaves of the IB tree including block pointers that point to data blocks. Together, the leaf IB's of a file track the file's logical address space. Each block pointer in each leaf IB corresponds to a logical address into the file and maps a logical address to a corresponding physical address (e.g., FSBN). BMD in sub-space 152d provides per-block metadata for data blocks in sub-space 152a. BMD are provided in elements, generally many per block, and each BMD element corresponds to a respective data block.

The file system 150 may include any number of files. Three files are shown, i.e., F1, F2, and VSDB (Version Set Database) file 154. In an example, file F1 stores a production data object available to hosts 110, and file F2 stores a snapshot (point-in-time version) of file F1. The file system 150 may include any number of snapshots, also referred to herein as "snaps," with each snap providing a respective point-in-time version of file F1 as of a respective time. VSDB 154 tracks the production file F1 as well as all of its snaps. In an example, file F1 stores a complete realization of a host-accessible data object, such as a LUN (Logical UNit) host file system, VVol (virtual machine disk), and the like. Mapping (not shown) within SP 120 translates host reads and writes directed to the data object to corresponding reads and writes of file F1. However, it should be appreciated that file F1 may be any type of file.

Files F1 and F2 (and any other snaps) typically share many data blocks. For example, at the time of its creation, file F2 may be identical to file F1 and may share all of its data blocks with F1. Over time, however, file F1 may change in response to data writes from hosts 110, which may overwrite data of F1 and/or append new data to F1. It can be determined whether file F1 shares a data block with file F2 by examining the block pointers for F1 and F2. If block pointers at the same logical address relative to the two files point to the same physical address, then the two files F1 and F2 share the pointed-to data block. Otherwise, they generally do not.

In example operation, the hosts 110(1-N) issue IO requests 112(1-N) to the data storage system 116 to effect reads and writes of data objects hosted by the data storage system 116. The SP 120 receives the IO requests 112(1-N) at the communication interfaces 122 and initiates further processing. Here, the IO requests 112(1-N) include a request 112a from host 110(1). In an example, request 112a specifies a write to file 112a1 (file F1), a range 112a2 within that file, such as a range of logical addresses, and new data 112a3 to be written. In this example, file F1 is assumed already to have a set of data stored in the specified range 112a2, such that the new data 112a3 will overwrite existing data in file F1. In some examples, the request 112a from host 110(1) specifies different information from that shown, e.g., according to the type of host-accessible data object realized in file F1, and the storage processor 120 performs mapping to convert the received information to the format shown. File system manager 150a receives request 112a and initiates further processing.

Figure 2A:
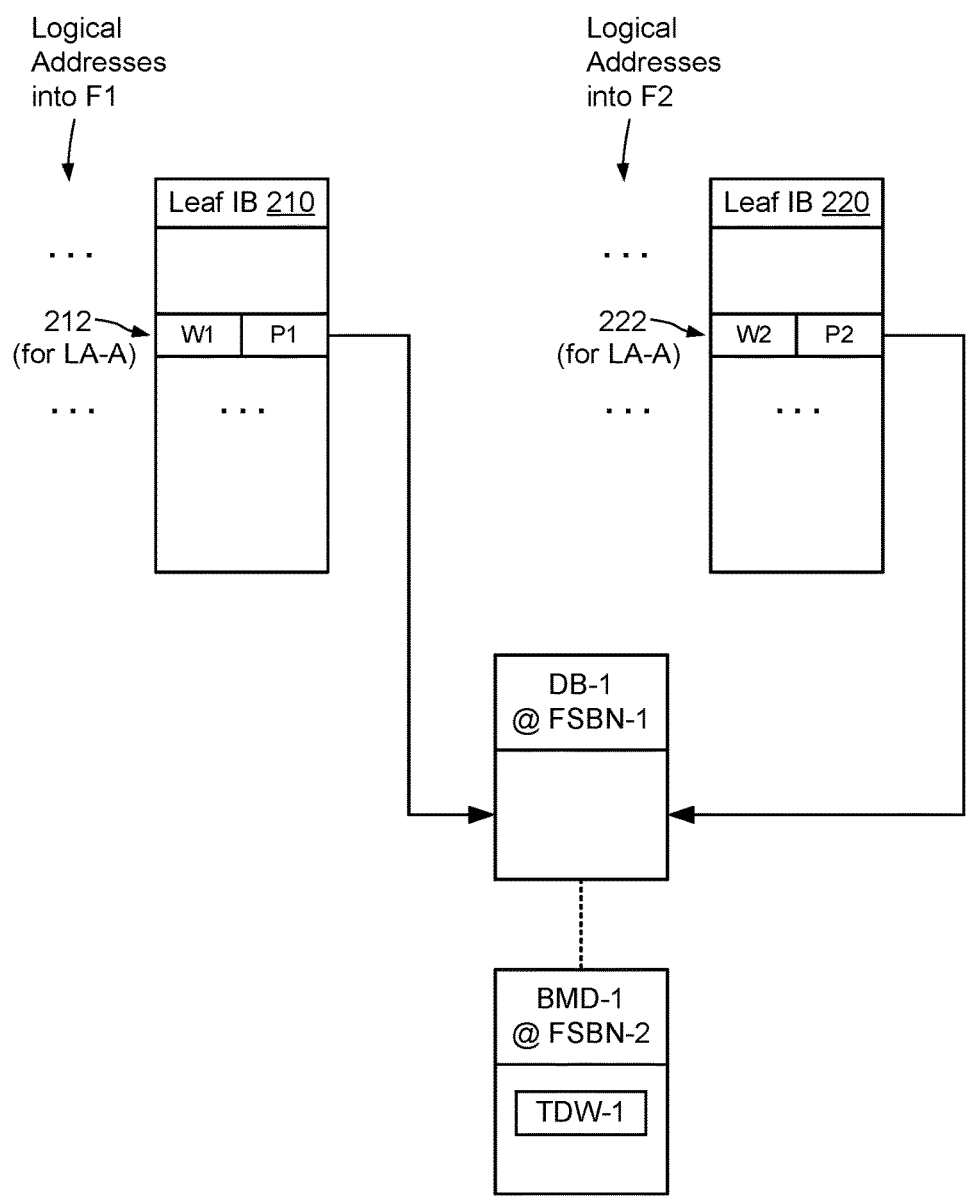
FIGS. 2A and 2B are block diagrams of example data and metadata structures involved in overwriting data in the environment of FIG. 1.

FIG. 2A shows an example arrangement for performing such further processing. Here, a leaf IB 210 resides within an IB tree of file F1 and has a block pointer 212, which corresponds to a logical address LA-A into file F1. For this example, it is assumed that logical address LA-A falls within the range 112a2 specified in request 112a.

Block pointer 212 has a pointer P1, which maps logical address LA-A to a physical address, FSBN-1, where data block DB-1 resides. Data block DB-1 has an associated BMD element, BMD-1, which resides at physical address FSBN-2.

It can be seen from FIG. 2A that data block DB-1 is a shared data block, as another block pointer 222 has a pointer P2 that also maps to FSBN-1, where DB-1 is store. In this example, block pointer 222 is part of leaf IB 220, which resides within an IB tree of file F2. Because file F2 is a snap of file F1, the data block DB-1 is found at the same logical address in both files, i.e., at LA-A.

As further shown in FIG. 2A, block pointer 212 has a reference weight W1 and block pointer 222 has a reference weight W2. These weights W1 and W2 may be referred to herein as "delegated weights." In addition, BMD-1 has a "total distributed weight," TDW-1. In an example, the file system manager 150a performs bookkeeping on reference weights to ensure that the sum of all delegated weights assigned to block pointers for a data block equals the total distributed weight in the BMD for that data block. Thus, assuming that block pointers 212 and 222 are the only block pointers in the file system 150 that share DB-1, operation of the file system manager 150a ensures that the sum of W1 and W2 equals TDW-1.

When responding to the request 112a to overwrite data in file F1 over a range that includes logical address LA-A with some or all of new data 112a3, file system manager 150a performs a write split. As will be described, the write split involves transferring weight between block pointers rather than returning weight to the BMD.

Figure 2B:
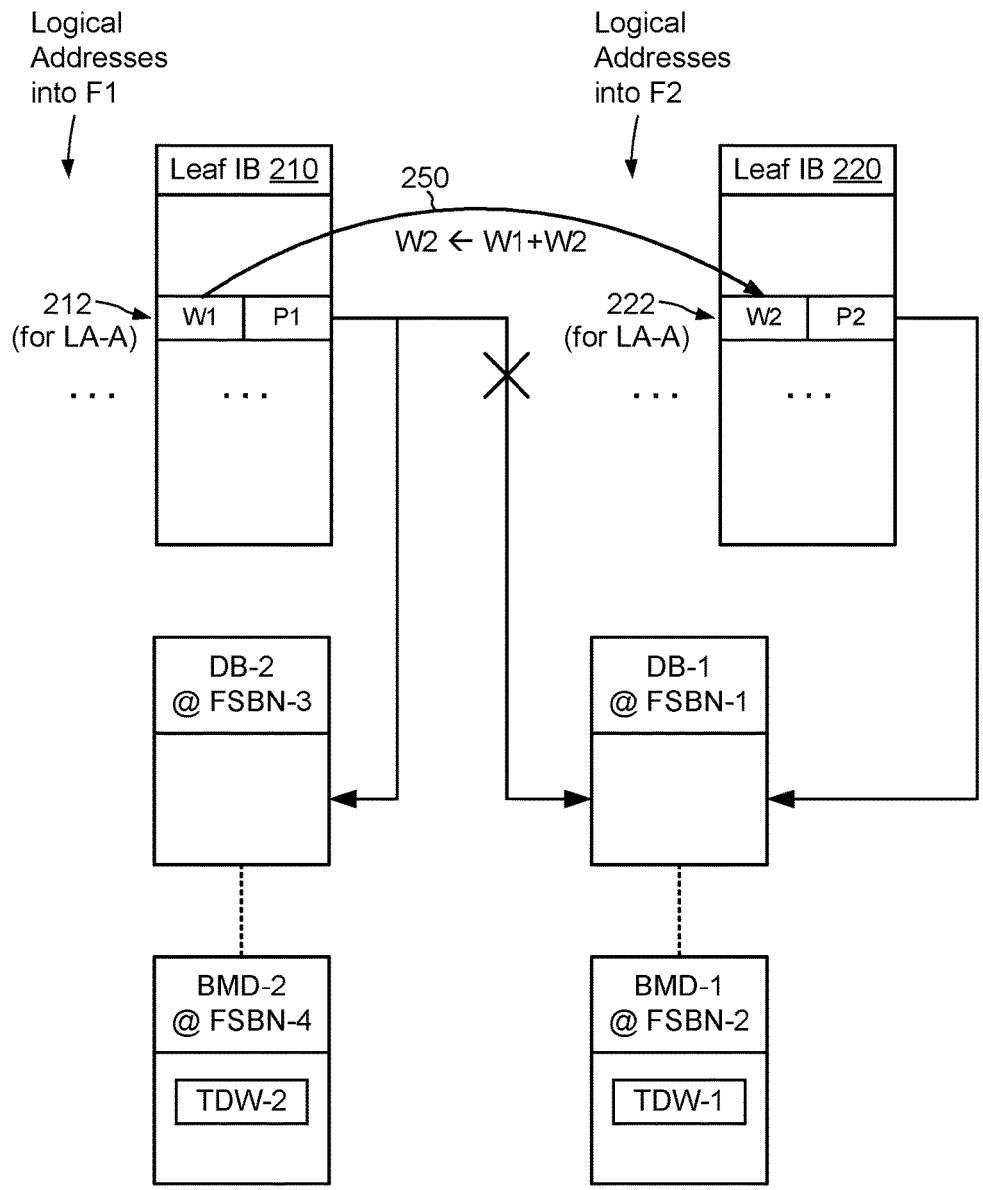

FIG. 2B shows example activities associated with a write split. Here, block pointer 212 initially maps to DB-1 at FSBN-1. However, to accommodate the new data 112a3 being overwritten, file system manager 150a allocates a new data block, DB-2, at FSBN-3. New data block DB-2 has an associated BMD element, BMD-2, which is located at FSBN-4. File system manager 150a may then store the new data 112a3, or a portion thereof aligned with LA-A, in DB-2.

File system manager 150a also updates pointers and reference weights. For example, file system manager 150a redirects pointer P1 in block pointer 212 to the new data block, DB-2, e.g., by changing the value of P1 from FSBN-1 to FSBN-3. Significantly, file system manager 150a also transfers the delegated reference weight W1 to the block pointer 222, i.e., the block pointer that previously shared DB-1. In particular, file system manager 150a updates the value of W2 in block pointer 222 such that W2 is made to equal the sum of W1 and the current value of W2 (see arrow 250). As a result, W2 holds the delegated reference weight previously delegated to both block pointers 212 and 222. The file system manager 150a may then update W1 to a new value, which may equal the total distributed weight of BMD-2, i.e., TDW-2. These acts may be performed in any suitable order, and some acts may be performed simultaneously. In some examples, these acts are performed atomically, to ensure either that all changes associated with overwriting the data are performed, or that none of them are performed.

In this manner, the sum of all delegated reference weights for DB-1 remains the same after the write split as before. Thus, it is not necessary to change TDW-1 in BMD-1, nor even to access BMD-1 at all, in performing this write split. As will be described, the ability to perform write splits without having to access BMD promotes great improvements in efficiency in data storage system 116.

In some examples, the process of performing a write split involves allocating a new IB. For example, if file F1 and file F2 are identical within the range of a single IB, the two files may share the same IB (i.e., IBs may be shared the same way as blocks). In this case, the write split operation involves allocating a new IB for F1 and copying the shared IB to the new one. The result of this copy would be the arrangement shown in FIG. 2A, however, such that operation would proceed as already described.

Figures 3, 4:
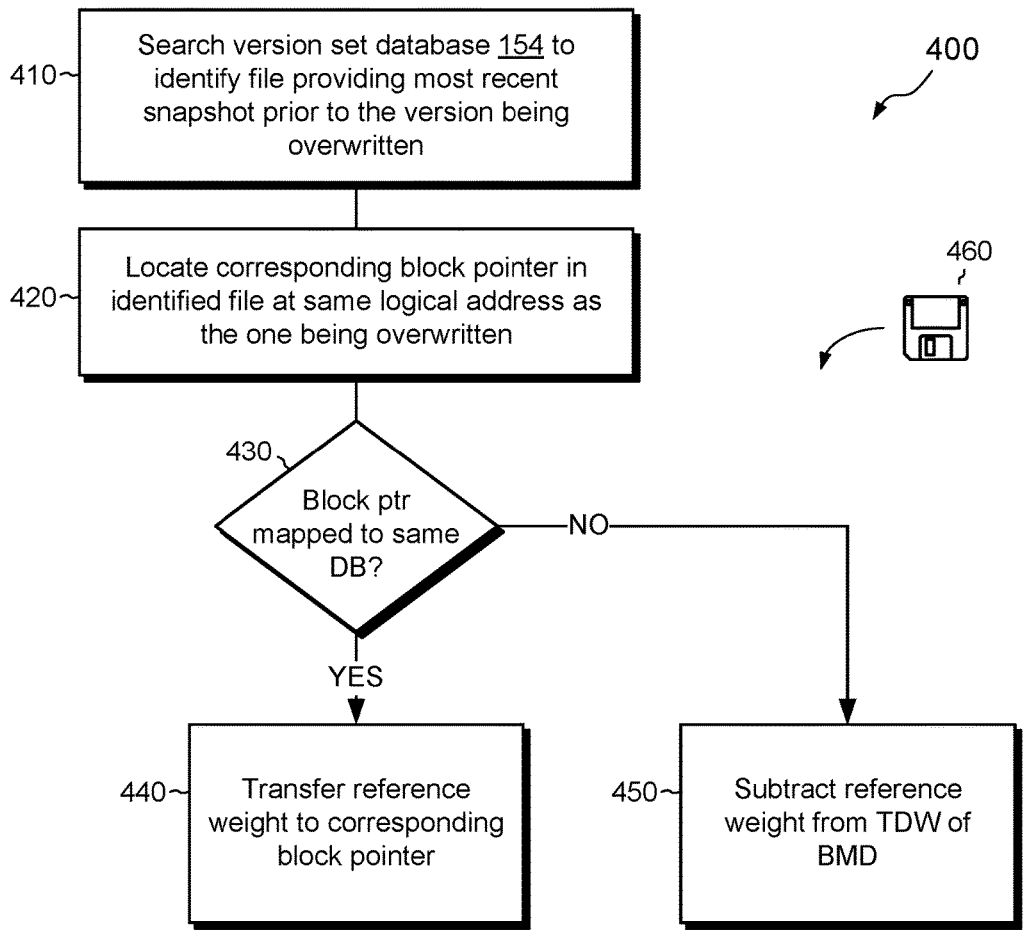
FIG. 3 is a block diagram of an example version set database as shown in FIG. 1.
FIG. 4 is a flowchart showing an example method for finding a sharing block pointer to which to transfer weight when performing a write split.

FIG. 3 shows an example version set database 154 in additional detail. Some embodiments hereof may employ the version set database 154 to identify "sharing" block pointers, i.e., those which point to the same data blocks, to which to transfer reference weights during write splits.

In the example shown, version set database 154 associates files in file system 150 with respective inode numbers and replica IDs. In an example, the files tracked by version set database 154 are limited to those which have a snap relationship with one another. For example, version set database 154 tracks file F1, which may store a live, production data object, also referred to as a "primary" object, as well as snaps of file F1, such as Snap 1, Snap 2, and Snap 3. Here, Snap 3 is provided by file F2. The inode number associated with each file provides a convenient and efficient means for the file system manager 150a to locate the respective file in the file system 150, and thus to access the file's IB tree and block pointers. Replica IDs provide a sequence of file creation or last update. For instance, Replica ID 1 identifies the first snap that was taken of file F1, Replica ID 2 identifies the second snap, and so on. The primary file F1 has the largest replica ID as it has been updated since the recent snap (Snap 3) was created. Small numbers are shown for ease of illustration. It should be appreciated, however, that the version set database 154 may track hundreds of snaps and may store a variety of information about those snaps. The example shown is merely illustrative. In an example, the version set database 154 is implemented as a directory file in file system 150; however, it may be implemented in any suitable way.

FIG. 4 shows an example method 400 for locating a sharing block pointer in the file system 150. Although FIGS. 2A and 2B show a block pointer 222 that shares DB-1 with block pointer 212, FIGS. 2A and 2B do not show how the file system manager 150a managed to locate block pointer 222, such that weight could be transferred. The method 400 provides an example process for finding sharing block pointers by leveraging snap relationships.

At 410, the file system manager 150a searches for an immediately prior version of the file being updated (e.g., file F1). For example, file system manager 150a searches version set database 154 and identifies Snap 3 (file F2), based, for example, on its presence in the version set database 154 and on its replica ID, which indicates that Snap 3 is the most recent, previous snap of file F1.

At 420, the file system manager 150a locates a corresponding block pointer in the identified file. The "corresponding block pointer" is the one in an IB tree of the identified file that maps the logical address currently being overwritten. For example, as shown in FIG. 2A, the block pointer 222 is a corresponding block pointer of the block pointer 212 because it maps the same logical address, LA-A, for file F2 as block pointer 212 maps for file F1.

At 430, the method 400 performs a testing operation, which is arranged to produce a first value, e.g., "YES," when the corresponding block pointer maps to the same data block as does the block pointer being accessed to perform the overwrite. For example, as shown in FIG. 2A, the corresponding block pointer 222 also points to DB-1 (at FSBN-2), so the result of testing operation 430 for this case is "YES." When the result of testing operation 430 is "YES," operation proceeds to 440, whereupon the file system manager 150a transfers the weight of the addressed block pointer to the corresponding block pointer. For instance, as shown in FIG. 2B, the file system manager 150a transfers the weight W1 of block pointer 212 to block pointer 222, such that the value of W2 is made to equal the sum of W1 and W2.

However, testing operation 430 is also arranged to produce a second value, e.g., "NO," when the corresponding block pointer maps to a different data block from the one being accessed to perform the overwrite. For example, if block pointer 222 in FIG. 2A had pointed to a data block other than DB-1, then there would have been no block sharing at this logical address with the identified snap. In this case, there may be no easily identifiable block pointer to which to transfer the weight W1. Although the file system manager 150a could try looking at other snaps in the version set database 154, the chances of its finding a shared block diminish as it looks at snaps further back in time. Also, the additional workload involved in searching additional snaps may not be justified. Therefore, in this example, upon the testing operation 430 producing a "NO" response, operation proceeds to 450, whereupon the file system manager 150a falls back on the previous technique for managing reference weights, i.e., by accessing the BMD for the data block. For instance, in the variant of FIG. 2A where block pointer 222 points to a block other than DB-1, the file system manager 150a accesses BMD-1. The file system manager 150a may confirm that DB-1 is shared, e.g., by confirming that TDW-1 is greater than W1. If DB-1 is shared, then the file system manager 150a updates TDW-1, e.g., by subtracting the value of W1 from TDW-1. If DB-1 is not shared, then the file system manager 150a may simply overwrite DB-1. No new data block, DB-2, would need to be allocated in the case of no block sharing, and no write split would need to be performed.

Figure 5:
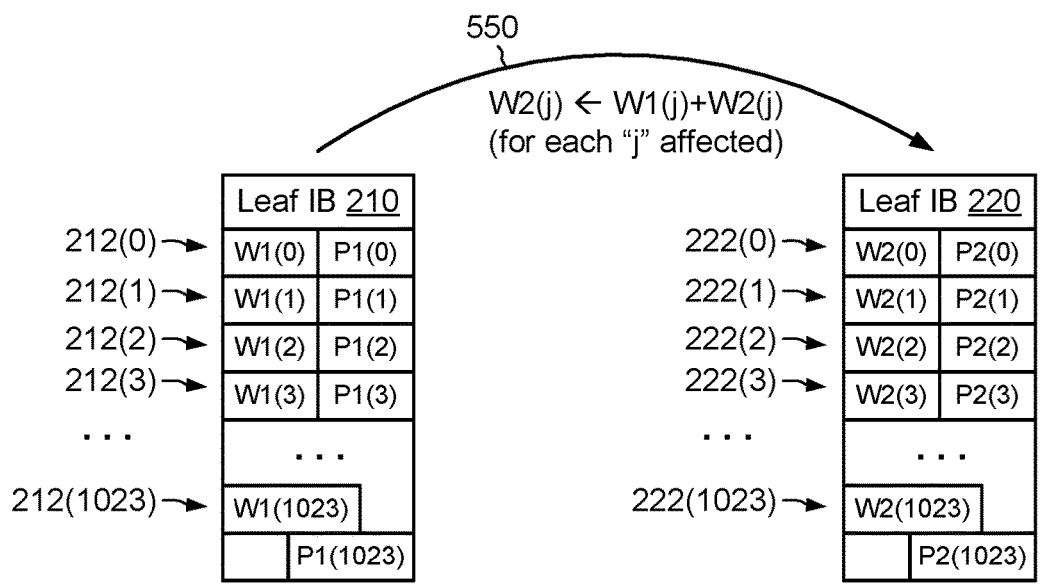
FIG. 5 is a block diagram showing an example arrangement for transferring multiple block pointer weights all at once.

FIG. 5 shows a variant of FIG. 2B. For purposes of this example, it is assumed that the range 112a2 specified in request 112a extends over multiple block pointers of leaf IB 210. Here, leaf IB 210 for file F1 is seen to include first block pointers 212(0) to 212(1023), which include first pointer values P1(0) to P1(1023) and first reference weights W1(0) to W1(1023) Likewise, leaf IB 220 for file F2 is seen to include second block pointers 222(0) to 222(1023), which include second pointer values P2(0) to P2(1023) and second reference weights W2(0) to W2(1023). The range 112a2 may extend over any number of these block pointers, including all of them.

If we assume that the range 112a2 extends over all block pointers in leaf IB 210 and that all data blocks pointed to by pointers P1(0) to P1(1023) are shared between files F1 and F2, then the reference weight updates in response to write splits on all 1024 locations may be performed all at once, without having to read any BMD or any leaf IBs other than leaf IBs 210 and 220. For example, as shown by arrow 550, for each "j-th" block pointer in leaf IB 210, the file system manager 150a adds the weight W1(j) of that block pointer to the corresponding weight W2(j) in leaf IB 220, with the resulting sum stored back in W2(j). This computation may be repeated for each value of j (e.g., 0 to 1023). It should be appreciated that such computations may be performed in memory and that the updates to weights W2(0) to W2(1023) may be committed to storage 180 with a write to a single block (IB 220). This example exemplifies a significant improvement over the prior technique, for which up to 1024 different BMD blocks might have to be read, modified, and written back to storage 180 to effect the same number of reference weight updates.

It is possible that some data blocks pointed to by block pointers in IB 210 may not be shared with block pointers in IB 220. However, once a first corresponding block pointer is located in IB 220 (e.g., after accessing the version set database 154; see FIG. 4), the other block pointers in IB 220 are already in memory. Thus, testing whether corresponding block pointers between the two IBs point to the same data blocks may be conducted entirely within memory, without having to access the version set database 154 again and without having to read any additional blocks from storage 180. For any pairs of corresponding block pointers that do not share the same data blocks, the file system manager 150a may fall back on the previous technique, e.g., as described in connection with act 450 of FIG. 4, but only for those non-matching block pointers.

Thus, the improved technique hereof significantly improves efficiency when applied to multiple block pointers in a single IB, which is a very common situation. Such improvements in efficiency translates to improved throughput in the data storage system 116, fewer delays for host applications waiting for their read and write requests to be processed, and an improved experience for any users of the host applications.

Figure 6:
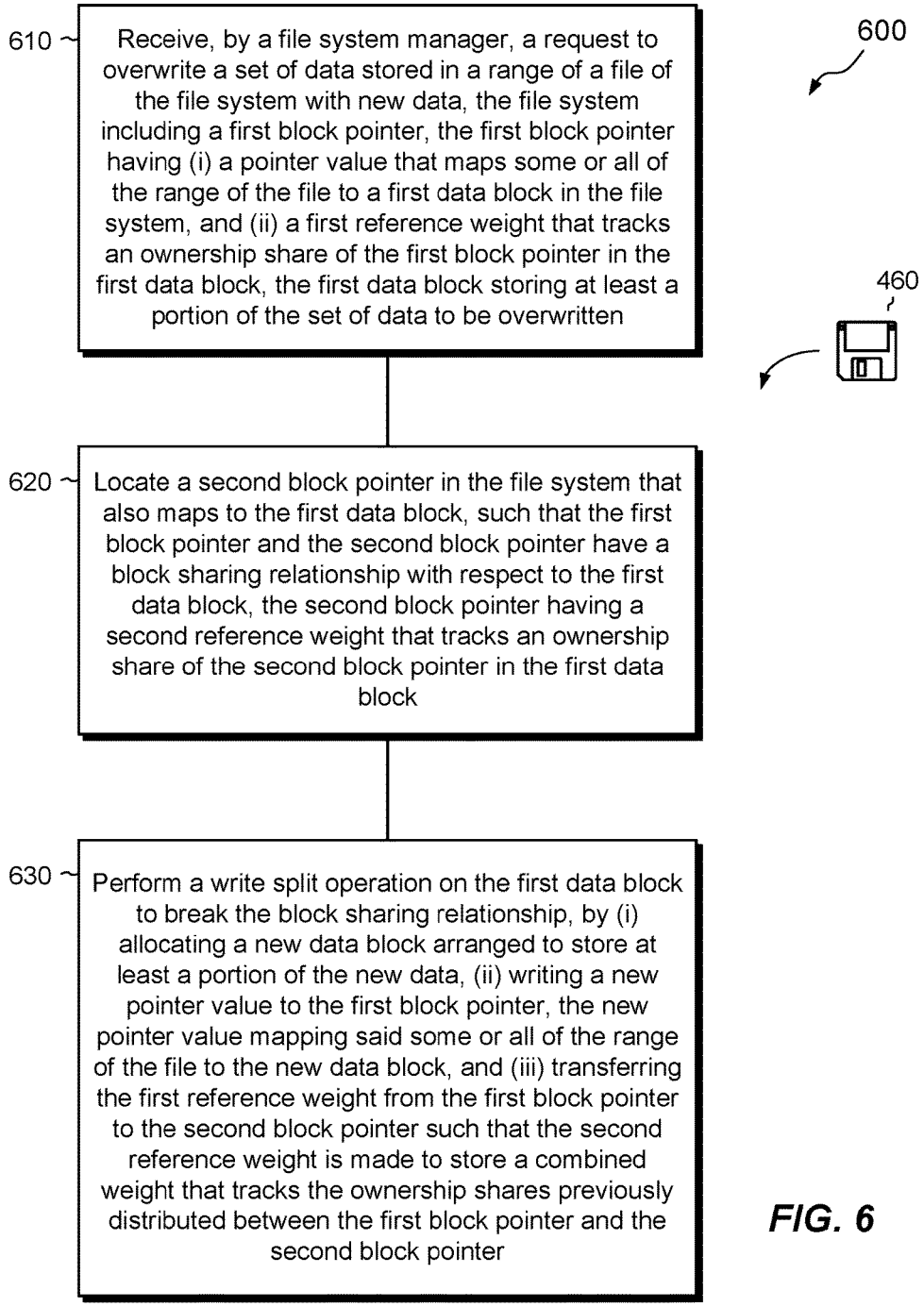
FIG. 6 is a flowchart shown an example method of overwriting shared data blocks in a file system.

FIG. 6 shows an example process 600 for overwriting shared data blocks in a file system. The process 600 may be carried out, for example, by the software constructs described in connection with FIG. 1, which reside in the memory 130 of SP 120 and are run by the set of processing units 124. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

At 610, the file system manager 150a receives a request 112a to overwrite a set of data stored in a range 112a2 of a file 112a1 of the file system 150 with new data 112a3. The file system 150 includes a first block pointer. 212, the first block pointer 212 having (i) a pointer value P1 that maps some or all of the range 112a2 of the file 112a1 to a first data block, DB-1, in the file system 150, and (ii) a first reference weight W1 that tracks an ownership share of the first block pointer 212 in the first data block DB-1, the first data block DB-1 storing at least a portion of the set of data to be overwritten At 620, file system manager 150a locates a second block pointer 222 in the file system 150 that also maps to the first data block, DB-1, such that the first block pointer 212 and the second block pointer 222 have a block sharing relationship with respect to the first data block, DB-1. The second block pointer 222 has a second reference weight W2 that tracks an ownership share of the second block pointer 220 in the first data block DB-1.

At 630, the file system manager 150a performs a write split operation on the first data block, DB-1, to break the block sharing relationship, by (i) allocating a new data block, DB-2, arranged to store at least a portion of the new data 112a3, (ii) writing a new pointer value, P1=FSBN-3, to the first block pointer 212, the new pointer value P1 mapping said some or all of the range of the file to the new data block DB-2, and (iii) transferring the first reference weight W1 from the first block pointer 212 to the second block pointer 222 such that the second reference weight W2 is made to store a combined weight that tracks the ownership shares previously distributed between the first block pointer 212 and the second block pointer 220.

Having described certain embodiments, numerous alternative embodiments or variations can be made. For example, although an arrangement has been described for locating sharing block pointers by accessing snaps in a version set database 154, this is merely an example. Alternatively, such sharing block pointers may be found by other means, and such sharing block pointers need not have any snapshot relationship with the file being written to. For example, sharing block pointers may be found by referencing a deduplication structure, which tracks block-sharing relationships induced by deduplication.

Further, although the process for transferring reference weights from one block pointer to another has been described as one of simple addition, it should be appreciated that addition is merely one way of combining reference weights. Other examples may include using encoded values or any other operation for maintaining equality between delegated reference weights stored in block pointers and total distributed weights stored in BMD.

Further, although it is shown and described that block pointers point directly to data blocks, such pointing need not be direct. For example, the file system 150 may include other metadata structures between block pointers and data blocks, such as block virtualization structures. In such examples, block pointers may point directly to such structures, which may themselves point directly to data blocks, and/or may point to other intervening structures, which point to data blocks.

Further, although various acts are shown and described as being performed by the file system manager 150a, it should be understood that the file system manager 150a need not be a single software component. Rather, the file system manager 150 may include any combination of components, such as processes, services, library functions, and the like, and is not limited to any particular software implementation.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 460 in FIGS. 4 and 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of overwriting shared data blocks in a file system, the method comprising:
   receiving, by a file system manager, a request to overwrite a set of data stored in a range of a file of the file system with new data, the file system including a first block pointer, the first block pointer having (i) a pointer value that maps some or all of the range of the file to a first data block in the file system, and (ii) a first reference weight that tracks an ownership share of the first block pointer in the first data block, the first data block storing at least a portion of the set of data to be overwritten;
   locating a second block pointer in the file system that also maps to the first data block, such that the first block pointer and the second block pointer have a block sharing relationship with respect to the first data block, the second block pointer having a second reference weight that tracks an ownership share of the second block pointer in the first data block; and
   performing a write split operation on the first data block to break the block sharing relationship, by (i) allocating a new data block arranged to store at least a portion of the new data, (ii) writing a new pointer value to the first block pointer, the new pointer value mapping said some or all of the range of the file to the new data block, and (iii) transferring the first reference weight from the first block pointer to the second block pointer such that the second reference weight is made to store a combined weight that tracks the ownership shares previously distributed between the first block pointer and the second block pointer.

2. The method of claim 1,
   wherein the file system stores the first block pointer in a first indirect block (IB) along with multiple other first block pointers for the first file, each of the other first block pointers for the first file (i) mapping a respective portion of the first file to a respective other first data block and (ii) having a respective first reference weight,
   wherein the file system includes a second file and the second block pointer performs mapping for the second file,
   wherein the file system stores the second block pointer in a second IB along with multiple other second block pointers for the second file, each of the other second block pointers for the second file (i) having a block-sharing relationship with a respective one of the other first block pointers and (ii) having a second reference weight.

3. The method of claim 2, further comprising:
   performing write split operations on the other first data blocks, including transferring the first reference weights from the other first block pointers to the respective other second block pointers such that the second reference weights of the respective other second block pointers are made to store combined weights previously distributed between the other first block pointers and the respective other second block pointers.

4. The method of claim 3, wherein transferring the first reference weights from the other first block pointers to the respective other second block pointers includes:
modifying the second IB in memory to update the second reference weights of the other second block pointers to reflect the respective combined weights; and
writing the updated second IB, including the updated second reference weights, to non-volatile storage.

5. The method of claim 2, wherein, prior to performing the write split operation, said some or all of the range of the file is located at a first logical address of the file, such that the first block pointer maps the first logical address of the file to the first data block, and wherein locating the second block pointer includes:
searching for another file in the file system that provides another version of the file;
upon finding the other file, locating a corresponding block pointer of the other file that maps the first logical address for the other file; and
performing a testing operation on the corresponding block pointer, the testing operation arranged to produce a first value when the corresponding block pointer maps to the first data block and to produce a second value when the corresponding block pointer does not map to the first data block, wherein the corresponding block pointer provides the second block pointer and the other file provides the second file in response to the testing operation producing the first value.

6. The method of claim 5, wherein the other file is a point-in-time snapshot of the file.

7. The method of claim 6, wherein searching for the other file in the file system includes performing a lookup in a version set database, the version set database identifying multiple other files in the file system that have a snapshot relationship with the file.

8. The method of claim 7, wherein searching for the other file in the file system further includes selecting, as the other file, a most-recently created snapshot in the version set database that was created prior to a most-recent update of the file.

9. The method of claim 1, further comprising:
receiving, by the file system manager, a second request to overwrite a second set of data stored in a second range of the file with other new data, the file system including a third block pointer, the third block pointer having (i) a sharing relationship with at least one other block pointer in the file system, (ii) a pointer value that maps some or all of the second range of the file to a third data block in the file system, and (iii) a third reference weight that tracks an ownership share of the third block pointer in the third data block;
searching for another block pointer in the file system with which the third block pointer has a sharing relationship; and
upon failing to find another such block pointer after checking one other file, performing a write split operation on the third data block, by (i) allocating another new data block arranged to store at least a portion of the other new data, (ii) writing a new pointer value to the third block pointer, the new pointer value mapping said some or all of the second range of the file to the other new data block, and (iii) subtracting the third reference weight of the third block pointer from a total distributed weight of a block metadata (BMD) structure provided for the third data block.

10. A data storage system, comprising control circuitry that includes a set of processing units coupled to memory, the control circuitry constructed and arranged to:
receive, by a file system manager, a request to overwrite a set of data stored in a range of a file of the file system with new data, the file system including a first block pointer, the first block pointer having (i) a pointer value that maps some or all of the range of the file to a first data block in the file system, and (ii) a first reference weight that tracks an ownership share of the first block pointer in the first data block, the first data block storing at least a portion of the set of data to be overwritten;
locate a second block pointer in the file system that also maps to the first data block, such that the first block pointer and the second block pointer have a block sharing relationship with respect to the first data block, the second block pointer having a second reference weight that tracks an ownership share of the second block pointer in the first data block; and
perform a write split operation on the first data block to break the block sharing relationship, by (i) allocating a new data block arranged to store at least a portion of the new data, (ii) writing a new pointer value to the first block pointer, the new pointer value mapping said some or all of the range of the file to the new data block, and (iii) transferring the first reference weight from the first block pointer to the second block pointer such that the second reference weight is made to store a combined weight that tracks the ownership shares previously distributed between the first block pointer and the second block pointer.

11. The data storage system of claim 10, wherein the control circuitry constructed and arranged to:
receive, by the file system manager, a second request to overwrite a second set of data stored in a second range of the file with other new data, the file system including a third block pointer, the third block pointer having (i) a sharing relationship with at least one other block pointer in the file system, (ii) a pointer value that maps some or all of the second range of the file to a third data block in the file system, and (iii) a third reference weight that tracks an ownership share of the third block pointer in the third data block;
search for another block pointer in the file system with which the third block pointer has a sharing relationship; and
upon a failure to find another such block pointer after checking one other file, perform a write split operation on the third data block, by (i) allocating another new data block arranged to store at least a portion of the other new data, (ii) writing a new pointer value to the third block pointer, the new pointer value mapping said some or all of the second range of the file to the other new data block, and (iii) subtracting the third reference weight of the third block pointer from a total distributed weight of a block metadata (BMD) structure provided for the third data block.

12. A computer program product including a set of non-transitory, computer-readable media having instructions which, when executed by control circuitry of a data storage system, cause the control circuitry to perform a method of overwriting shared data blocks in a file system, the method comprising:
receiving, by a file system manager, a request to overwrite a set of data stored in a range of a file of the file system with new data, the file system including a first block pointer, the first block pointer having (i) a pointer value that maps some or all of the range of the file to a first data block in the file system, and (ii) a first reference weight that tracks an ownership share of the first block pointer in the first data block, the first data block storing at least a portion of the set of data to be overwritten;

locating a second block pointer in the file system that also maps to the first data block, such that the first block pointer and the second block pointer have a block sharing relationship with respect to the first data block, the second block pointer having a second reference weight that tracks an ownership share of the second block pointer in the first data block; and performing a write split operation on the first data block to break the block sharing relationship, by (i) allocating a new data block arranged to store at least a portion of the new data, (ii) writing a new pointer value to the first block pointer, the new pointer value mapping said some or all of the range of the file to the new data block, and (iii) transferring the first reference weight from the first block pointer to the second block pointer such that the second reference weight is made to store a combined weight that tracks the ownership shares previously distributed between the first block pointer and the second block pointer.

13. The computer program product of claim 12,
wherein the file system stores the first block pointer in a first indirect block (TB) along with multiple other first block pointers for the first file, each of the other first block pointers for the first file (i) mapping a respective portion of the first file to a respective other first data block and (ii) having a respective first reference weight,
wherein the file system includes a second file and the second block pointer performs mapping for the second file,
wherein the file system stores the second block pointer in a second IB along with multiple other second block pointers for the second file, each of the other second block pointers for the second file (i) having a block-sharing relationship with a respective one of the other first block pointers and (ii) having a second reference weight.

14. The computer program product of claim 13, wherein the method further comprises:
performing write split operations on the other first data blocks, including transferring the first reference weights from the other first block pointers to the respective other second block pointers such that the second reference weights of the respective other second block pointers are made to store combined weights previously distributed between the other first block pointers and the respective other second block pointers.

15. The computer program product of claim 14, wherein transferring the first reference weights from the other first block pointers to the respective other second block pointers includes:
modifying the second IB in memory to update the second reference weights of the other second block pointers to reflect the respective combined weights; and
writing the updated second IB, including the updated second reference weights, to non-volatile storage.

16. The computer program product of claim 13, wherein, prior to performing the write split operation, said some or all of the range of the file is located at a first logical address of the file, such that the first block pointer maps the first logical address of the file to the first data block, and wherein locating the second block pointer includes:
searching for another file in the file system that provides another version of the file;
upon finding the other file, locating a corresponding block pointer of the other file that maps the first logical address for the other file; and
performing a testing operation on the corresponding block pointer, the testing operation arranged to produce a first value when the corresponding block pointer maps to the first data block and to produce a second value when the corresponding block pointer does not map to the first data block, wherein the corresponding block pointer provides the second block pointer and the other file provides the second file in response to the testing operation producing the first value.

17. The computer program product of claim 16, wherein the other file is a point-in-time snapshot of the file.

18. The computer program product of claim 17, wherein searching for the other file in the file system includes performing a lookup in a version set database, the version set database identifying multiple other files in the file system that have a snapshot relationship with the file.

19. The computer program product of claim 18, wherein searching for the other file in the file system further includes selecting, as the other file, a most-recently created snapshot in the version set database that was created prior to a most-recent update of the file.

20. The computer program product of claim 12, wherein the method further comprises:
receiving, by the file system manager, a second request to overwrite a second set of data stored in a second range of the file with other new data, the file system including a third block pointer, the third block pointer having (i) a sharing relationship with at least one other block pointer in the file system, (ii) a pointer value that maps some or all of the second range of the file to a third data block in the file system, and (iii) a third reference weight that tracks an ownership share of the third block pointer in the third data block;
searching for another block pointer in the file system with which the third block pointer has a sharing relationship; and
upon failing to find another such block pointer after checking one other file, performing a write split operation on the third data block, by (i) allocating another new data block arranged to store at least a portion of the other new data, (ii) writing a new pointer value to the third block pointer, the new pointer value mapping said some or all of the second range of the file to the other new data block, and (iii) subtracting the third reference weight of the third block pointer from a total distributed weight of a block metadata (BMD) structure provided for the third data block.

* * * * *